United States Patent [19]

Schilling

[11] Patent Number: 4,547,224

[45] Date of Patent: Oct. 15, 1985

[54] EMULSIFIERS FOR BITUMINOUS EMULSIONS

[75] Inventor: Peter Schilling, Charleston, S.C.

[73] Assignee: Westvaco Corporation, New York, N.Y.

[21] Appl. No.: 651,467

[22] Filed: Sep. 17, 1984

[51] Int. Cl.$^4$ .............................................. C08L 95/00
[52] U.S. Cl. .................................. 106/273; 106/277; 106/281 R; 252/311.5
[58] Field of Search .................... 106/273, 277, 281 R; 252/311.5

[56] References Cited

U.S. PATENT DOCUMENTS

| | | | |
|---|---|---|---|
| 3,006,860 | 10/1961 | Heinz ................................ | 252/311.5 |
| 3,062,829 | 11/1962 | Wright et al. ..................... | 252/311.5 |
| 3,097,174 | 7/1963 | Mertens ............................ | 252/311.5 |
| 3,123,569 | 3/1964 | Borgfeldt ......................... | 252/311.5 |
| 3,220,953 | 11/1965 | Borgfeldt ......................... | 252/311.5 |
| 3,230,104 | 1/1966 | Falkenberg et al. ................ | 106/277 |
| 3,344,082 | 9/1967 | Montgomery et al. ........... | 252/311.5 |
| 3,350,321 | 10/1967 | Conn ................................ | 252/311.5 |
| 3,412,056 | 11/1968 | Crawford et al. .................... | 260/22 |
| 3,445,258 | 5/1969 | Ferm et al. ............................ | 106/277 |
| 3,451,958 | 6/1969 | Riedeman et al. ..................... | 260/23 |
| 3,466,247 | 9/1969 | Ohtsuka et al. .................. | 252/311.5 |
| 3,518,101 | 6/1970 | Gzemski et al. ..................... | 106/277 |
| 3,594,201 | 7/1971 | Sommer et al. ...................... | 106/277 |
| 3,615,796 | 10/1971 | Schreuders ........................... | 106/277 |
| 3,728,278 | 4/1973 | Tramelli ............................ | 252/311.5 |
| 3,738,852 | 6/1973 | Doi et al. ............................. | 106/277 |
| 3,764,359 | 10/1973 | Dybalski ............................. | 106/280 |
| 3,867,162 | 2/1975 | Elste, Jr. .............................. | 106/277 |
| 3,956,002 | 5/1976 | Moorer ............................... | 106/277 |
| 3,957,524 | 5/1976 | Doughty et al. ..................... | 106/277 |
| 3,997,354 | 12/1976 | Pivette et al. ................... | 106/273 N |
| 4,088,505 | 5/1978 | Moorer ............................... | 106/277 |
| 4,447,269 | 5/1984 | Schreuders et al. ............. | 252/311.5 |
| 4,450,011 | 5/1984 | Schilling et al. ................ | 106/273 N |
| 4,462,840 | 7/1984 | Schilling et al. ..................... | 106/277 |
| 4,464,285 | 8/1984 | Schilling ............................. | 106/277 |
| 4,464,286 | 8/1984 | Schilling ........................... | 106/311.5 |
| 4,478,642 | 10/1984 | Schilling et al. ................ | 106/273 N |
| 4,494,992 | 1/1985 | Schilling et al. ................ | 106/273 N |

FOREIGN PATENT DOCUMENTS 571474 1/1976 Switzerland .
1032363 6/1966 United Kingdom .

OTHER PUBLICATIONS

Chemical Abstracts, vol. 86, (1977), p. 550, 189248b.
Chemical Abstracts, vol. 87, (1977), p. 85, 169578b.
Chemical Abstracts, vol. 87, (1977), p. 108, 70170a.
Chemical Abstracts, vol. 88, (1978), pp. 36–37, 122176z.
Chemical Abstracts, vol. 66, (1967), p. 218, 2223z.
Chemical Abstracts, vol. 79, (1973), p. 176, 81434a.
Official Gazette, vol. 911, No. 3, (Jun. 19, 1973), p. 1006.

Primary Examiner—Paul Lieberman
Assistant Examiner—Willie Thompson
Attorney, Agent, or Firm—Terry B. McDaniel; Richard L. Schmalz

[57] ABSTRACT

Reaction products of polyamines with certain polycarboxylic acid anhydrides are disclosed which give emulsions capable of producing medium set mixing grade asphalt emulsions, rapid set asphalt emulsions, and quick set slurry seal emulsions. Solventless asphalts as well as asphalts containing up to 15% by volume of a hydrocarbon oil can be used for emulsification.

20 Claims, No Drawings

EMULSIFIERS FOR BITUMINOUS EMULSIONS

BACKGROUND OF THE INVENTION

(1) Field of the Invention

This invention relates to medium set mixing grade asphalt emulsions, rapid set emulsions and quick set slurry seal emulsions. More particularly, it relates to novel emulsifiers for solventless and solvent containing mixing grade, oil-in-water anionic and cationic bituminous emulsions, which emulsifiers are the reaction products of polyamines with certain polycarboxylic acid anhydrides and their modified products. Modifications are carried out by reacting the nitrogen-containing intermediates with formaldehyde and sodium sulfite or bisulfite, chloroalkane sulfonic acid salts, γ-propane sultone, chloromethane phosphonic acid, acrylic acid, fumaric acid, maleic acid and chloroalkanoic acids.

(2) Description of the Prior Art

In paving operations, three main practices are employed to achieve thorough mixing of bitumen and aggregate:

(1) Mixing of free flowing heated asphalt (asphalt cement) with pre-dried aggregate;

(2) mixing pre-dried aggregate with asphalt diluted with a hydrocarbon solvent (cutback asphalt, cutter stock) at ambient temperatures; and (3) mixing aggregate with asphalt emulsions, e.g., oil-in-water emulsions, obtained by vigorous agitation of asphalt and water in the presence of an emulsifying agent.

Because of increasing cost in energy and hydrocarbon solvents and because of environmental concerns, the use of emulsified asphalt is increasing. Dependent on the emulsifier used to achieve an emulsion, anionic or cationic emulsions are obtained. In anionic emulsions, asphalt droplets are negatively charged; in cationic emulsions, the asphalt droplets bear positive charges and migrate to the cathode when an electric field is applied.

Generally, depending on the characteristics of the type of mixing and rate of break, bituminous emulsions are classified as rapid setting, medium setting and slow setting. In the case of rapid setting emulsions, mainly used for repair work of old wearing courses, the emulsion is applied on the existing surface and aggregate is spread on top, and after compaction, the road can be opened to traffic shortly after the application of the new coat (chip seal, etc.). Medium setting emulsions are mixed with aggregate prior to being used in road construction, and slow set emulsions can be mixed with aggregate and stored for a longer period of time without breaking on the aggregate surface.

Anionic bituminous emulsions are taught by Wright and Mertens in U.S. Pat. No. 3,062,829 to be prepared by employing alkali emulsifier and polyamide additives which are the condensation products of dilinoleic acid and polyalkylene polyamines. Lignin amines are taught as anionic emulsifiers in U.S. Pat. No. 3,123,569 to Borgfeldt. Also, Moorer, in U.S. Pat. No. 3,956,092, teaches an anionic emulsifier consisting of an oxygenated alkali lignin, an ethylene oxide adduct of alkyl-phenol, and up to 10% by weight of sodium borate; and, in U.S. Pat. No. 4,088,505, he teaches an anionic emulsifier consisting of an alkali metal salt of an alkali lignin, an ethylene oxide adduct of alkyl-phenol and water. In addition, Montgomery and Pitchford teaches the alkali metal salts of complex polynuclear aromatic polycarboxylic acids as anionic asphalt emulsifiers in U.S. Pat. No. 3,344,082. Heinz, in U.S. Pat. No. 3,006,860, similarly employs alkali metal soaps of higher fatty acids as those found in tall oil.

Ferm, in U.S. Pat. No. 3,740,344, teaches the preparation of quick-setting anionic slurry seal compositions by applying a combination of anionic emulsifiers such as aryl alkyl sulfonates and condensation products of ethylene oxide with alkylated phenols, with fatty alcohols, with mono-esters of fatty acids with glycerol or sorbitol or long chain fatty acids. H. G. Schreuders, in U.S. Pat. No. 3,615,796, teaches the use of petroleum sulfonates as quick-setting anionic slurry seal emulsifiers. A combination of sodium lignate or lignosulfonate and saponified rosin or tall oil is described in U.S. Pat. No. 3,594,201 by Sommer and Evans. Also, Conn, in U.S. Pat. No. 3,350,321, describes the use of alkyl or alkoxyalkyl phosphoric acids as emulsifiers for asphalts.

Cationic emulsions are obtained by employing a variety of nitrogen containing organic compounds, such as fatty amines, fatty diamines, fatty triamines, fatty amidoamines, fatty imidazolines, and reaction products of all these compounds with ethylene oxide and fatty mono- and diquaternary ammonium salts. The fatty radical of these compounds can have a variety of chemical structure, and the building blocks for the preparation of these amines can be obtained from a variety of sources, such as petroleum refinates, animal fats, vegetable and fish oils, and tall oil. Amidoamines suitable as emulsifiers are disclosed in U.S. Pat. No. 3,230,104 to Falkenberg and in U.S. Pat. No. 3,097,174 to Mertens. Combinations of fatty monoamines and triamines are disclosed in U.S. Pat. No. 3,738,852 to Doi; fatty diamines are disclosed in U.S. Pat. No. 3,728,278 to Tramelli and U.S. Pat. No. 3,581,101 to Gzemski; fatty quaternary and diquaternary salts and modifications thereof are disclosed in U.S. Pat. No. 3,220,953 to Borgfeldt, U.S. Pat. No. 3,867,162 to Elste, U.S. Pat. No. 3,764,359 to Dybalski, U.S. Pat. No. 3,956,524 to Doughty and U.S. Pat. No. 3,466,247 to Ohtsuka, and fatty imidazolines are taught in U.S. Pat. No. 3,445,258 to Ferm.

Generally, asphalt emulsions prepared with fatty amines, fatty diamines, fatty amidoamines, etc., are unstable when mixed with a variety of siliceous or calcareous aggregates. Rapid breaking on the aggregate surface is observed with an increase in stiffening. At this point, the mix becomes unworkable. To overcome this problem, it is common practice to use cutback asphalt instead of asphalt cement for medium set mixing grade asphalt emulsions. Although cutback emulsions prepared with these emulsifiers also break when mixed with the aggregate, the solvent (a hydrocarbon oil, such as naphtha, kerosene, diesel oil, etc.) decreases the viscosity of the asphalt and increases the workability of the aggregate-asphalt mix. After placement of the mixes, the solvent evaporates and the final stiff aggregate-asphalt matrix is obtained. Because of the dramatically increased cost of solvents in recent years and because of the effort to reduce pollution, suitable emulsifiers are sought for mixing grade emulsions without using solvent. The use of tallow quaternary ammonium salts and tallow diquaternary diammonium salts for making emulsions suitable for slurry seal, a solventless application, is described in U.S. Pat. No. 3,764,359 to Dybalsky, and the use of a quaternary amine obtained by reacting epichlorohydrin, trimethylamine and nonyl-phenol for solventless mixes is disclosed in U.S. Pat. No. 3,956,524 to Doughty.

In U.S. Pat. No. 4,447,269, an aqueous bituminous emulsion fine-grained aggregate slurry mixture is disclosed which deposits at a fairly rapid rate after being applied to the surface to be treated, and is usable for a longer period of time to enable application in slurry form. The disclosed cationic quick setting and solventless medium setting asphalt emulsion is formed with an emulsifier which is the product of the reaction of a polyamine with a polycarboxylic acid of the general formula

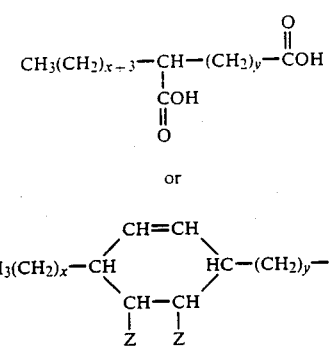

or wherein x and y are integers from 3 to 9, x and y together equal 12, at least one Z is a carboxylic acid group and any remaining Z is hydrogen. The rate of setting is determined by emulsifier dosage, pH, aggregate gradation and temperature.

The general object of this invention is to provide novel versatile emulsifiers for solventless and solvent containing rapid setting and medium setting mixing grade, oil-in-water bituminous emulsions. Another object of this invention is to provide emulsifier formulations for mixing grade emulsions which give a variety of set times as expressed in percent initial washoff coating (the percent coat on the aggregate surface after one minute mixing and immediate immersion in water) and percent one hour washoff coating. A further object of this invention is to provide new amidoamines, imidoamines or imidazolines, and amphoteric derivatives prepared by reacting polycarboxylic acid anhydrides with polyamines and by modifying these products with a variety of reagents such as formaldehyde and sodium sulfite or bisulfite, haloalkane sufonic acid sodium salts, γ-propane sultone, chlorohydroxy proapane sulfonic acid sodium salt, vinyl sulfonic acid sodium salt, haloalkanoic acids, such as chloroacetic acid, α,β-unsaturated carboxylic acids, such as acrylic, metacrylic, fumaric and maleic acid, epoxy carboxylic acids, halo alkane phosphoric acids, formaldehyde and phosphorous acid in the presence of hydrochloric acid, suitable as emulsifiers for both anionic and cationic oil-in-water emulsions. From the literature, it is known that these reagents react with the active nitrogens of amines in Mannich type reactions, by Michael additions or by nucleophilic substitution yielding amino alkyl-sulfonic acids, and amino alkyl carboxylic acids (amino acids). These products are amphoteric. They are soluble at both acidic and alkaline pH-values, and at the isoelectric point, where the number of positive charges equals the number of negative charges on the molecule, they do not move when an electrical field is applied, and they show reduced solubility in water.

SUMMARY OF THE INVENTION

It has been found that reaction products of polyamines with certain tricarboxylic acid anhydrides and modified products thereof give emulsions capable of producing anionic and cationic medium set mixing grade asphalt emulsions, as well as rapid set asphalt emulsions. Solventless asphalts as well as asphalts up to 15% by volume of a hydrocarbon oil can be used for emulsification.

DESCRIPTION OF THE PREFERRED EMBODIMENTS

The polycarboxylic acid anhydrides used in the preparation of the invention anionic and cationic emulsifiers are of the following formulae:

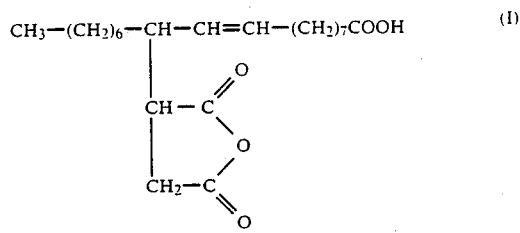

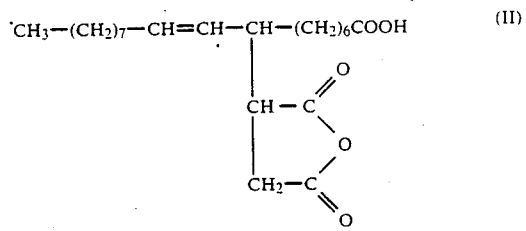

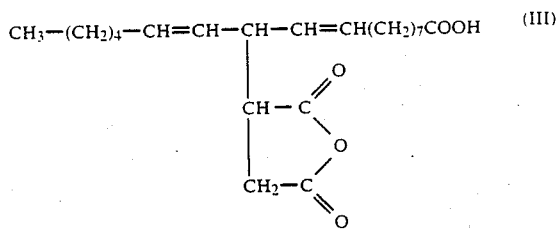

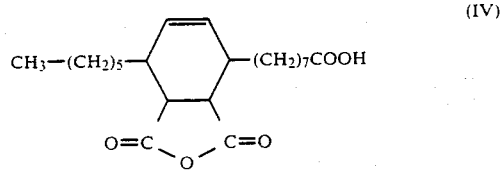

$C_{22}$-tricarboxylic acid anhydrides I and II are isomers and are obtained by the reaction of oleic acid or elaidic acid with maleic anhydride at temperatures of 180° C. and above. Anhydride II is the mono adduct of maleic anhydride and linoleic acid. Because of the two double bonds a second mole of maleic anhydride can be added resulting in a pentacarboxylic acid di-anhydride. I, II and III are the major reaction products derived from tall oil fatty acid and maleic anhydride as described by Riedeman and Lupichuck in U.S. Pat. No. 3,451,958. Anhydride IV is obtained when linoleic acid is catalytically isomerized to conjugated linoleic acid prior to the reaction with maleic anhydride. Via a Diels Alder cycloaddition, a cyclohexene tricarboxylic acid anhydride is obtained. The preparation of this type of cycloaliphatic acid anhydride from conjugated linoleic acid and maleic anhydride is disclosed by Crawford in British Pat. No. 1,032,363 and U.S. Pat. No. 3,712,056. Since tall oil fatty acid consists of approximately 50% oleic acid and 50% linoleic acid, the maleic anhydride addition in the presence of iodine will give a mixture of cyclic (IV) and open (I, II) $C_{22}$-tricarboxylic acid anhydrides.

When the 1 mole of the polycarboxylic acid anhydrides is mixed with 2 moles of a polyamine, such as diethylene triamine, the carboxylic group will be neutralized and a mono ammonium salt will result (V). Upon heating to 80°–90° C. the very reactive anhydride group will react yielding an imidoamine-ammonium salt (VI). Increasig the temperature to 150°–180° C. the terminal carboxylic group will react to an amido resulting in a $C_{22}$-based imidoamine-amidoamine (VII). If the amine is one of the class able to give imidazolines, such as diethylene triamine, upon heating above 250° C. an imidoamine-imidazoline will result (VIII). By increasing the weight ratio of acid to amine polymeric products (polyimides-amides) will be obtained.

If three or more moles of amine per mole of polycarboxylic acid anhydride are used, triamidoamine (X) and triamidazoline (XI) could be formed in a similar sequence via the diammonium salt of the mono amidoamine (IX).

The reaction sequence is indicated by reacting (I) with diethylene triamine:

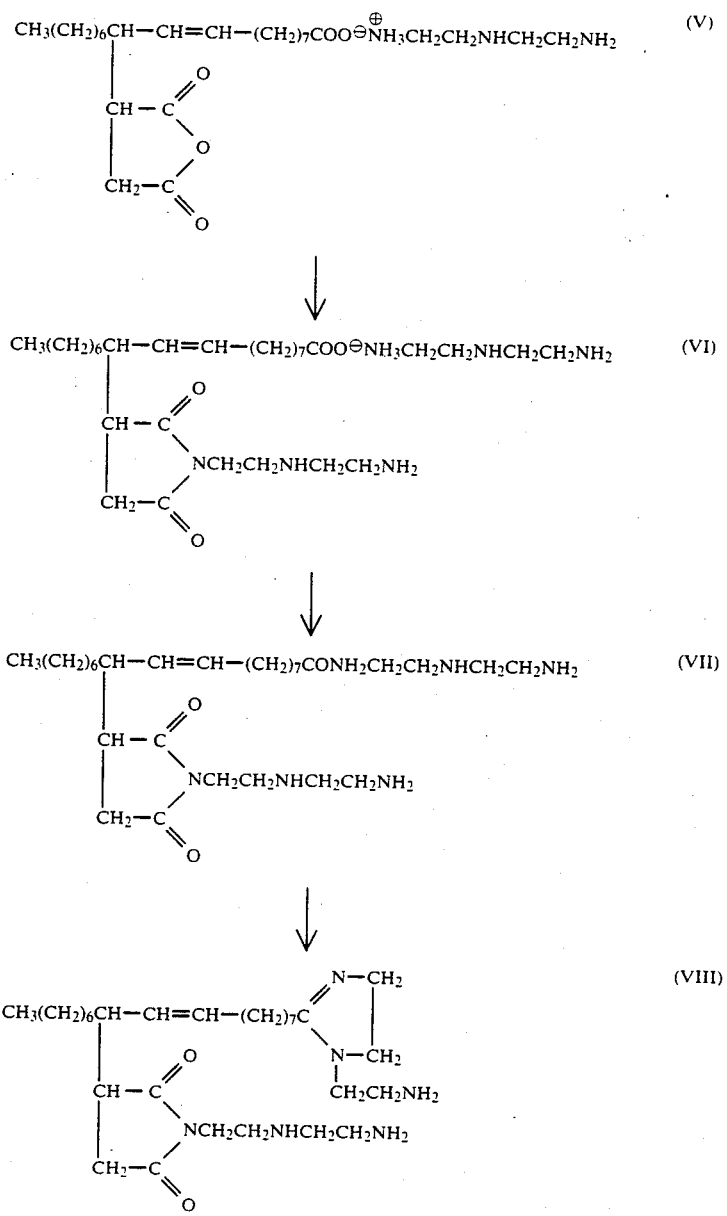

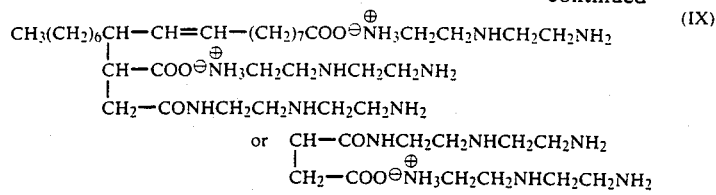

(IX)

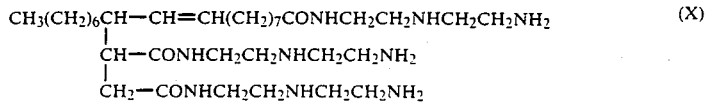

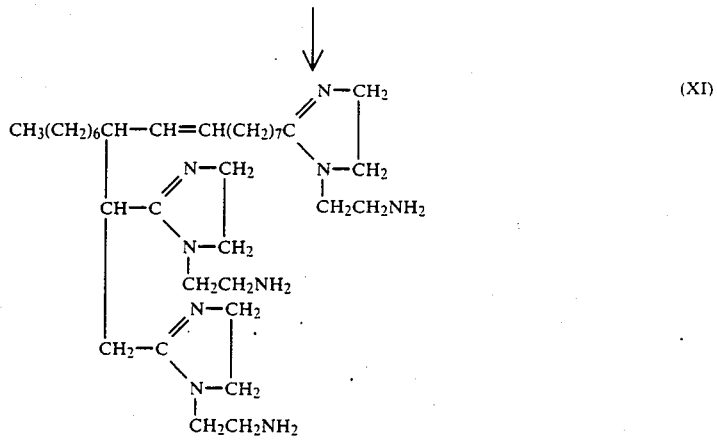

(X)

(XI)

Compounds VI through XI can also be obtained by reacting maleic anhydride adducts of natural oil (vegetable oils) (triglycerides) with polyamines. Intermediates VI and IX are amphoteric substances and show solubility in both acids and alkali. The cycloaliphatic $C_{22}$-tricarboxylic anhydride can undergo the same reaction sequence.

Amphoteric amido(amido)amines derived from ethylene diamine, propylene diamine, the N-methyl-, N-ethyl- N,N-dimethyl- and N,N-diethyl-derivatives thereof can be made from this anhydride without difficulty since they will react below their boiling points. Amidoamines of these polyamines and fatty acids are usually more difficult to prepare since the amines will distill from the reaction mixture before the reaction is completed, resulting in acid insoluble diamides.

These above described products will, however, never be obtained in high purity since the tall oil fatty acids contain other reactive impurities, such as small amount of resin acids which will also react with maleic anhydride, and saturated fatty acids. All these minor components will react with the amines to give amidoamines; small amounts of polymeric material will be also formed.

The formation of imidoamine-imidazolines and imidazolines is limited to polyethylene amines and polyamines characterized by at least one ethylene diamine functional group with at least three hydrogens attached to the two nitrogens. Compounds of this group which are able to give both amidoamines and imidazolines are: ethylene diamine, diethylene triamine, triethylene tetramine, tetraethylene pentamine, pentaethylene hexamine, and higher homologues; aminoethyl ethanolamine, N-aminoethyl propane diamine, N,N'-diamonoethyl propane diamine and the N-aminoethyl or N,N'-diaminoethyl substituted butane diamines, pentane diamines and hexane diamines, and N-hydroxy ethyl ethylene diamine. These compounds have the general formulae

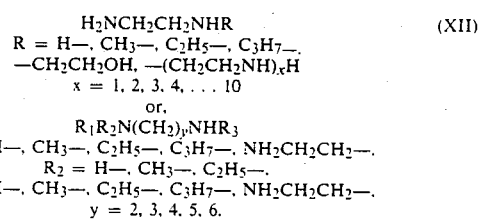

Amines capable of forming amidoamines but not imidazolines are: 1,3-diaminopropane, 1,4-diaminobutane 1,5-diaminopentane, 1,6-diaminohexane, piperazine (1,4-diazacyclohexane), N-aminoethylpiperazine, N-aminopropyl-propane diamine-1,3, N-methyl-N-aminopropylpropane diamine-1,3, N,N-dimethylpropane diamine-1,3, N,N-diethyl propane diamine-1,3, N,N-dimethyl-ethylene diamine, N-N-diethyl ethylenediamine; N-aminohexylhexane diamine-1,6.

Further modifications of the above described mono-, di-, or triamidoamines, imidoamines or imidazolines are the reaction products with reactive oxirane systems such as ethylene oxide, propylene oxide or butylene oxide. Reaction occurs preferentially on primary and secondary nitrogens, that is, a nitrogen to which one or two hydrogen atoms are covalently bound. The reaction products belong to the class of N-hydroxyethyl, N-2-hydroxypropyl- and N-2-hydroxy butyl amidoamines or imidazolines. To obtain intermediates for further modification, the nitrogens with active hydrogens attached should be reacted only partially with these three membered ring-oxides.

Combinations of amidoamines, based on fatty monocarboxylic acids of various sources or resin acids and $C_{22}$-tricarboxylic acid anhydrides disclosed in this invention, can also be obtained by reacting suitable polyamines with a blend of fatty monocarboxylic or tricarboxylic acid anhydrides. Monocarboxylic acids suitable for this purpose are tall oil fatty acids, crude tall oil, rosin, rosin reacted with fumaric acid, maleic acid or maleic anhydride, tall oil pitch or tall oil pitch reacted with maleic anhydride, tallow fatty acids, soya fatty acids and the like. These blends can be also obtained by partial maleinization of tall oil or other fatty acids. Blends of $C_{21}$-cyclohexene-dicarboxylic acid and $C_{22}$-tricarboxylic acid anhydride can be obtained by first reacting linoleic acid with acrylic acid and post-reacting the remaining oleic and elaidic acid with maleic anhydride. Kraft lignin or Vinsol may also be co-reacted.

Dimer acids, which are long chain $C_{36}$-aliphatic carboxylic acids obtained by dimerization of fatty acids of various sources, may be also co-reacted. An example of this type of acid is produced by Emery Industries, Inc. under the trade name "Empol® Dimer Acids".

Depending on the numbers of active nitrogens in these nitrogen-containing derivatives, one, two or more mols of reagent per mol of amidoamine or imidazoline can be reacted. To illustrate the novel modifications of the above described imidoamines, imidoamines and imidazolines, the reaction products of two moles aminoethylpiperazine or diethylene triamine with one mole of $C_{22}$-tricarboxylic acid anhydride will serve as intermediates.

In the case of the imidoamine-amidoamines (XIII, XIV)

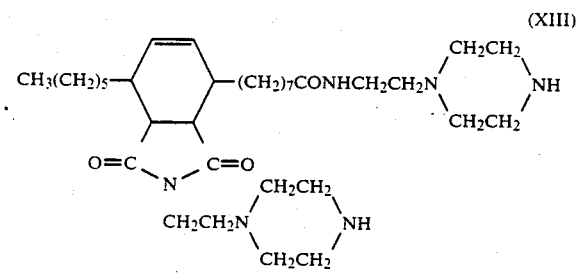

(XIII)

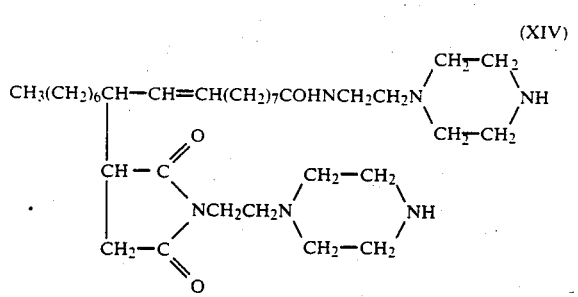

(XIV)

one or two moles of reagent can be added to the terminal NH-groups.

In the case of the imidoamine-imidazolines (VIII, XV)

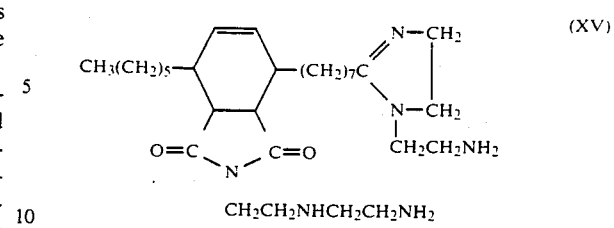

(XV)

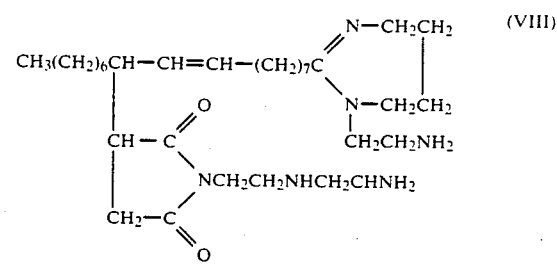

(VIII)

one to five moles of reagents will react with the terminal $NH_2$-groups and the NH-group.

The following structures are obtained by reaction with:

(a) formaldehyde and sodium sulfite or bisulfite

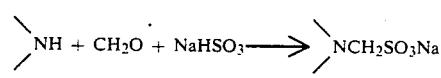

(b) halo-alkane sulfonic acid sodium salts

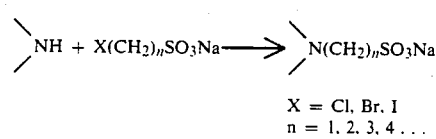

X = Cl, Br, I
n = 1, 2, 3, 4 ...

(c) γ-propane sultone

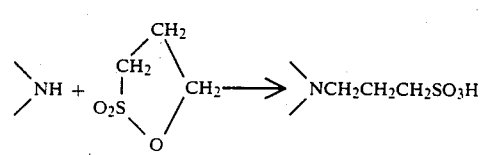

(d) chlorohydroxypropane sulfonic acid sodium salt

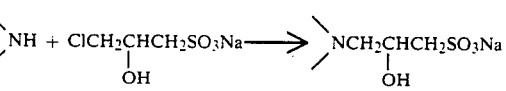

(e) haloalkanoic acids (or sodium salts)

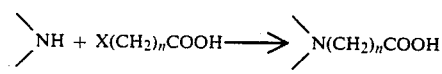

X = Cl, Br, I
n = 1, 2, 3, 4 ...

(f) α,β-unsaturated carboxylic or dicarboxylic acids:

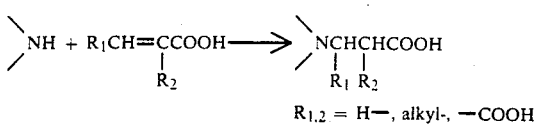

(g) haloalkane phosphonic acids

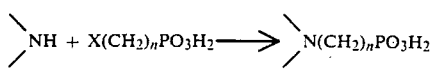

(h) formaldehyde and phosphorous acid in the presence of hydrochloric acid

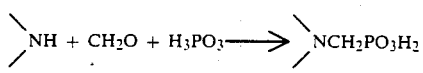

The sulfomethylation of fatty monocarboxylic acid-polyamine condensation products with formaldehyde and bisulfite is taught by Hochreuter in Swiss Pat. No. 571,474. These products are used to improve plastic material, leather or paper. He also describes modification of these sulfonated products by post-alkylation with alkyl halogenides, chloroacetic acid, acrylamide, acrylonitrile, ethylene oxide or propylene oxide, and sulfomethylated quaternary nitrogen compounds. These compounds have anti-static, bactericidal and dirt repellent properties. In Japanese Kokais Nos. 77 65,141 and 77 58,708, Nomoto et al. teach preparation of hydrolyzed reaction product of a lauric acid-aminoethylethanolamine condensate with ethyl acrylate useful as corrosion inhibitor or in cleaning compositions. Takahashi et al. teach the preparation of the carboxyethylated derivatives of the condensation product of oleic acid and diethylene triamine in Japanese Kokai No. 77 108,915 useful as stabilizer for ethylene oxide-propylene oxide copolymers.

British Pat. No. 1,037,645 describes quaternary nitrogen compounds obtained by reacting the condensation products of oleic acid with aminoethylethanol amine or lauric acid with N,N-dimethyl propane diamine with sodium chlorohydroxy propane sulfonate. Reaction products of fatty acid-polyamine condensates with sodium chloroacetate are taught by Nagata in Japanese Kokai No. 73 42,004 as additives for heavy oil. Reitz and Boehmke in German Offen. No. 2,537,289 teach the condensation of fatty acids with the reaction products of polyamines treated with sodium hydroxyethanesulfonate resulting in products with surfactant properties.

The preferred embodiment of the invention which follows is illustrative of emulsifiers used to obtain asphalt in water emulsions eminently useful for mixing under shear with a variety of siliceous and calcareous aggregates. After setting (evaporation of water), the asphalt films show excellent adhesion to the aggregate surface.

In preparing the bituminous emulsions of this invention, an aqueous soap solution of the emulsifiers described below is intimately mixed under high shear in a colloid mill. The bitumen content can range from 30% to about 80% by weight, preferably between 60% and 70%. The dosage of the emulsifier can range from 0.1–10% by weight of the emulsion, preferably between 0.25–2.5% by weight of the emulsion. Dependent on the emulsifier, a mixing grade cationic emulsion is obtained in a pH range of 1–7, with the optimum performance at a pH of about 2.5 to 4. An anionic mixing grade emulsion, on the other hand, is obtained in a pH range of greater than 7 to 12, with the optimum performance at a pH of about 10 to 11.5.

The "bitumen" used in the emulsion may be derived from domestic or foreign crude oil; it also includes bitumen, natural asphalt, petroleum oil, oil residue of paving grade, plastic residue from coal tar distillation, petroleum pitch, and asphalt cements diluted with solvents (cutback asphalts). Practically any viscosity or penetration graded asphalt cement for use in pavement construction as described in ASTM designation D-3381 and D-946 may be emulsified with the aid of the emulsifiers of this invention.

The acidic soap solutions are normally obtained by suspending the amidoamine in water to which a sufficient amount of a suitable acid, for instance, hydrochloric, sulfuric, and phosphoric acid or the like is added as necessary for the desired pH value of 1–7 and a clear emulsifier solution is obtained. Alkaline soaps are obtained by adding sodium hydroxide or any other suitable base to the aqueous suspension of the emulsifier. Thereafter, the (acidic or alkaline) soap solution, which is preheated to about 55° C., and the fluid asphalt, which is preheated to 120°–125° C., are mixed under high shear in a colloid mill for 30 seconds to give asphalt emulsions of brown color and creamy texture. Prior to testing according to ASTM D-244, the emulsions are stored at 70° C. for 16 hours. Aggregate mixing tests are performed by placing a weighed amount of aggregate in a mixing bowl, adding 5–10% by weight of the emulsion on top of the aggregate and mixing for one minute to five minutes. The mix is divided into three equal parts and placed in three dishes. The first sample is set aside; the second sample is washed with water immediately after mixing; and the third sample is washed with water after it was set aside for one hour. The percent coating of the aggregate surface is estimated visually. From the first sample, the percent initial coating, from the second sample, the percent initial washoff coating, and from the third sample, the percent one-hour washoff coating are obtained. The construction industry coating requirements are generally set at 90–95% minimum.

A typical aqueous bituminous emulsion aggregate slurry is formulated in the laboratory with an amount of aggregate pre-wetted with water and admixed with a suitable bituminous emulsion to a desired consistency. Suitable consistency is obtained by using mixed gradations of aggregates forming a smooth non-separating uniform mixture of aqueous bituminous emulsion-aggregate which can be evenly spread onto an existing surface. The ultimate toughness of the applied slurry is obtained as the bitumen, such as asphalt, deposits on the aggregate particles and binds the newly applied coating to the pre-existing surface as a mixture of asphalt cement and aggregate.

As a paving technique at the roadsite, a mobile self-propelled unit capable of uniformly metering the aggregate, water, inorganic and organic additives emulsion components, may be used. A typical unit is equipped with separate tanks for aggregate, water, emulsion and additives which are continually metered into a mixing chamber at a pre-determined ratio. The continually fed components are retained in the mixing chamber for approximately one minute and then fed into a spreader-box and applied to the surface to be coated. Batch operated pneumatic devices can also be used for suitable placement of the bituminous aggregate slurries of this invention.

The emulsifiers for the solventless emulsions of this invention perform very satisfactorily without auxiliary emulsifiers. However, occasionally it may be necessary to alter the performance of the emulsion to obtain improved viscosity at a given asphalt content or improved stability to dust and fines on the aggregate and to lengthen or shorten setting time, etc. One of two methods can be employed. In case of cationic slurry seal, either a mixture of tall oil fatty acids, preferably tall oil pitch, can be added to the bitumen (asphalt) prior to emulsification to improve break or improve the viscosity of the emulsion, or blends of the above described imidoamines-amidoamines, imidoamine-imidazolines or their derivatives with compatible cationic or nonionic emulsifiers may be used for the emulsification of the bitumen. Auxiliary emulsifiers, which may constitute up to 90% of the total combined emulsifier formulation, are fatty amines, fatty propane diamines, fatty amidoamines, and fatty imidazolines. This class of compounds generally decreases setting time. Others are fatty monoquaternary ammonium salts and fatty diquaternary diammonium salts and nonionic emulsifiers, such as ethylene glycol polyethers of nonyl- or dodecyl phenol.

Modified emulsifier combinations also can be obtained when blends of fatty amines, fatty diamines and amidoamines or imidazolines derived from $C_{19}$-, $C_{21}$-dicarboxylic, sulfonated oleic acid, sulfonated tall oil fatty acids, tall oil fatty acids and resin acids undergo the invention process chemical modifications. Amidoamines or imidazolines of $C_{36}$-dicarboxylic acids (dimerized linoleic acid, etc.) may also be added to the blends.

In the case of anionic emulsions, blends of the amphoteric compounds (type VI, IX or modified type VII, XIII, XIV, XV-derivatives) with emulsifiers commonly used for anionic bituminous emulsions can be employed. Examples of such emulsifiers are fatty acids, especially tall oil fatty acids, resin acids, lignin isolated from sulfite or kraft pulping lignins, and sulfonic acid-containing surfactants such as aralkylsulfonates, long chain alkylsulfonates and petroleum sulfonates.

$C_{19}$-dicarboxylic acid, $C_{21}$-dicarboxylic acid, $C_{22}$-tricarboxylic acid or sulfonated fatty acids may also be blended with the amphoteric compounds prior to the addition of alkali.

Depending on the type of aggregate and its cleanliness, mixing is improved when aggregate is prewetted with 1-5% water by weight of the aggregate. The performance of the asphalt emulsions in regard to mixing characteristics and setting (higher percentage of one-hour washoff coat) can, if necessary, also be improved when, based on the weight of asphalt, 1-15% of a solvent such as diesel oil is added to the asphalt prior to emulsification. The emulsions prepared with the emulsifiers disclosed in this invention are stable and can be stored for a long period of time until required for use. Depending on the intended application, the emulsion may be mixed with the aggregate at a central mixing plant in a large pug mill and the mix transported to the job site. Alternatively, the emulsion may be taken to the job site and mixed there, either with a mixing device, such as motorized mixing equipment, or manually.

The aggregates of the invention paving slurry seal mixtures are conventional difficult to coat, densely graded aggregates such as sand, pit-run, crusher-run, etc., which range in size from anything passing through a No. 4 sieve and at least 80% retained on 200 mesh (U.S. Standard Series).

Aggregate mixing tests are performed by mixing the aggregate with water and aqueous bituminous emulsion. An inorganic additive-mineral filler, such as portland cement, hydrated lime, limestone dust and fly ash, may be added to accelerate set/break time and salts, such as ammonium sulfate, aluminum sulfate and other inorganic sulfates, or surfactants may be added to retard the set/break of the slurry system. Mineral fillers shall comply with the requirements of ASTM D242. These materials are mixed in a mixing bowl until a homogeneous slurry mixture is obtained. The inability to form a stable slurry within 3 to 4 minutes of mixing time when proper proportions of each ingredient are used would indicate a mixture in which the materials are not compatible. This mix design is necessary to simulate field conditions. After the slurry is mixed, it is spread in a mold which is placed on an asphalt felt, and the set/break time is measured by blotting the exposed slurry surface with a paper towel. If no brown stain is transferred to the paper towel, the slurry is considered to be "set." The cure time could also be measured with a cohesion testing device. Many other tests such as described in ASTM D3910 are used to measure strength and other physical properties of the slurry. The *Performance Guide for Slurry Seal* published by the Asphalt Emulsion Manufacturers Association is used to measure the performance of the slurry seal.

The emulsion should be stable during mixing and should set within the designed time period following application. The emulsifiers of this invention perform very satisfactorily without auxiliary emulsifiers.

For instance, the setting times can be controlled with the concentration of emulsifier, the addition of lime, cement or an inorganic additive, which would alter the break characteristics of the slurry system. An organic additive-polymer latex may also be employed to strengthen the matrix. The organic additive is preferably added to the emulsion-aggregate slurry.

The bituminous emulsions employed in the invention slurries are mixing grade slurries. The set time may be increased by adding alum (aluminum sulfate), or shortened by adding lime or cement, providing an emulsion with quick-setting characteristics. Addition of small amounts of alum will improve mixing performance.

The practice of this invention may be seen in the following examples wherein the preparation of various types of the emulsifiers of the invention is described and wherein the advantages of using these compounds in a medium setting mixing grade bituminous emulsion and slurry seal applications are illustrated.

EXAMPLE 1

This example illustrates the variety of emulsifiers which can be obtained by the modification of reaction products of $C_{22}$-tricarboxylic acid anhydrides with polyamines.

Preparation of Maleic Anhydride Adducts

To 280 parts of oleic or tall oil fatty acids 50 to 100 parts of maleic anhydride was added and heated to 180°-220° C. for 3-8 hours. In the case of iodine catalyzed reactions 0.6 parts of iodine was added at ambient temperature. The reactions were followed by gas chromatography and Infrared-Spectroscopy. If not otherwise mentioned, the crude reaction products were used for further condensation with the polyamines.

Amphoterics (prepared from I–IV or their blends)

One hundred (100) parts of anhydride are blended with 100 parts of a polyethylene amine such as ethylene diamine, propylene diamine, diethylene triamine, etc. and heated with stirring at 80°–100° C. until a 1% aqueous solution of the resulting products is soluble in dilute acid and dilute alkali.

Imidoamine-Amidoamines or Polyamidoamines (prepared from I–IV or their blends)

One hundred (100) parts of anhydride are blended with 100 parts of diethylene triamine or blend of polyethylene amines consisting of diethylene triamine, triethylene tetramine, aminoethyl piperazine and aminoethyl ethanol amine and heated to 180°–220° C. After all the distillate was collected, it was cooled and diluted with isopropanol to keep the reaction products in fluid form.

Imidoamino-Imidazolines, Amidoamino-Imidazolines (prepared from I–IV or their blends)

One hundred (100) parts of anhydride are blended with 100 parts of diethylene triamine and heated to 260° C. until all the condensation water and excess amine are collected. After cooling it was diluted with isopropanol.

Mixed $C_{21}$-Dicarboxylic Acid-$C_{22}$-tricarboxylic Acid Anhydride-Polyamine Reaction Products To Diacid 1525 ® consisting of Diacid 1550 ® and a blend of oleic and elaidic acid is added 1 mole of maleic anhydride per mole $C_{18}$-unsaturated acid. It is heated to 180°–220° C. for 6 hours and cooled. To one mole of the resulting reaction product at least 2 moles of polyamine mixture is added and heated to 240° C. until all reaction water is collected. Dilution with isopropanol is optional.

Mixed Monoamidoamines-$C_{22}$-Tricarboxylic Acid Imidoamino-Amidoamines (or Polyamidoamines)

' These products are derived by heating of non-modified fatty acids and fatty acid-maleic anhydride adducts with polyamines.

To one mole of the blend 1.5–2 moles of the polyamine is added and heated to 180°–220° C. until all the reaction water and excess amine are collected.

Derivatizations

1. Sulfomethylation:

Based on the molecular weight and on the number of active N—H bonds, 0.1–1 moles of sodium sulfite or sodium bisulfite per active NH— group was dissolved in an adequate amount of water and added to the polyamine condensates. The reaction is slightly exothermic. To this blend 1–4 moles of formaldehyde in form of paraformaldehyde or as a 37% solution in water was added. The addition is accompanied by an exothermic reaction. Alternatively, formaldehyde may be added to the sulfite solution, and the reaction product formed by these reagents may be added to the nitrogen-containing compounds. Clear solutions were obtained by adding isopropanol and water in the final product at the proper ratio.

2. Carboxyalkylation:

Per active NH— group 0.1 to 1 mole of reactive carboxylic acids such as chloroacetic acid or the corresponding sodium salt or acrylic acid was dissolved, or slurried in isopropanol or water and added to one mole of the polyamine condensation product. The additions were accompanied by a rise in temperature. To ensure completion of the alkylations, the reaction mixtures were kept for 1–2 hours at 60°–70° C.

Slurry Seal Experiments

Table I illustrates the set times of the emulsion aggregate-slurries dependent on the amount of $C_{22}$-tricarboxylic acid anhydride-polyamine condensate in the emulsifier mixture. High content requires no break (set) retarder such as aluminum sulfate; lower content requires retarder in order to obtain mixing times of at least one minute. Emulsions were prepared with Exxon asphalt (50/70 penetration) at 64% residue. Camak-aggregate (Granite, Ga.) was used for the slurry seal experiments.

TABLE I

SET TIMES OF CATIONIC SLURRIES

| Emulsifier (non-derivatized) $C_{22}$—Tricarboxylic Acid Anhydride/ Polyamine | Emulsifier Dosage (%) | Emulsion pH Value | Set Time (min.) Without $Al_2(SO_4)_3$ | With $Al_2(SO_4)_3$ |
|---|---|---|---|---|
| Oleic Acid-Maleic Anhydride 1.5:1$^a$/Amine Blend L-5$^b$- | 1.5 | 2.5 | 60+ | 60+ |
| Maleic Anhydride 2.8:1 ($I_2$)/ Amine Blend 1483$^c$- | 1.5 | 2.5 | 60+ | — |
| Maleic Anhydride 2.8:1/Amine Blend M28B$^d$- | 1.5 | 2.5 | 60+ | — |
| Maleic Anhydride 2.8:1 ($I_2$)/ Amine Blend 1483$^c$- | 1.5 | 2.5 | 60+ | — |
| Maleic Anhydride 2.8:1/ Diethylene Triamine L-5$^b$- | 1.5 | 2.5 | 60+ | — |
| Maleic Anhydride 2.8:1/ Diethylene Triamine M28B$^d$- | 1.5 | 2.5 | 60+ | — |
| Maleic Anhydride 2.8:1/ Diethylene Triamine L-5$^b$- | 1.5 | 2.5 | 60+ | 60+ |
| Maleic Anhydride 2.8:0.5 ($I_2$)/ Amine Blend L-5$^b$- | 1.5 | 2.5 | partially broken$^f$ | 60+ |
| Maleic Anhydride 2.8:0.5/Amine Blend 1483$^c$- | 1.5 | 2.5 | broke$^f$ | 60+ |
| Maleic Anhydride 2.8:0.5/Amine Blend M28B$^d$- | 1.5 | 2.5 | broke$^f$ | 60+ |
| Maleic Anhydride 2.8:0.5 ($I_2$)/ Amine Blend L-5$^b$- | 1.5 | 2.5 | broke$^f$ | 60+ |
| Maleic Anhydride (2.8:1)-L-5$^b$ 1:1/ Amine Blend 1483$^c$- | 1.5 | 2.5 | broke$^f$ | 60+ |
| Maleic Anhydride (2.8:1)-Rosin S 1:1/ Diethylene Triamine Tall Oil Pitch- Maleic Anhydride | 1.5 | 2.5 | 60+ | 60— |

TABLE I-continued
SET TIMES OF CATIONIC SLURRIES

| Emulsifier (non-derivatized) $C_{22}$—Tricarboxylic Acid Anhydride/ Polyamine | Emulsifier Dosage (%) | Emulsion pH Value | Set Time (min.) Without $Al_2(SO_4)_3$ | Set Time (min.) With $Al_2(SO_4)_3$ |
|---|---|---|---|---|
| 3.0:0.5/Amine Blend Diacid 1525[e]- Maleic Anhydride 3.5:0.5/Amine Blend | 1.5 | 2.5 | 60+ | — |

[a]Excess maleic anhydride was removed by washing with water.
[b]Tall oil fatty acid rich in oleic acid and linoleic acid.
[c]Tall oil fatty acid rich in oleic acid and elaidic acid.
[d]Tall oil fatty acid with 25-30% rosin.
[e]Modified tall oil fatty acid containing $C_{21}$—dicarboxylic acid (Diacid 1550 ®).
[f]Broke during mixing process.

Table II and III illustrate the set times of cationic and anionic slurries prepared with emulsions containing amphoteric emulsifiers.

TABLE II
SET TIMES OF CATIONIC SLURRIES[a]

| Emulsifier (derivatized) $C_{22}$—Tricarboxylic Acid Anhydride/Polyamine/ Derivatizing Agent | Emulsifier Dosage (%) | Emulsion pH Value | Set Time (min.) |
|---|---|---|---|
| L-5[b]- Maleic Anhydride 2.8:1 ($I_2$)/ Amine Blend/ Acrylic Acid | 1.5 | 2.5 | 60+ |
| 1483[c]- Maleic Anhydride 2.8:1/ Amine Blend/ Chloroacetic Acid | 1.5 | 2.5 | 60+ |
| M28B[d]- Maleic Anhydride 2.8:1 ($I_2$)/ Amine Blend Chloroacetic Acid | 1.5 | 2.5 | 60+ |

[a]Exxon (Humble) asphalt - 50/70 penetration at 64% residue was used for all experiments.
[b]Tall oil fatty acid rich in linoleic and oleic acid.
[c]Tall oil fatty acid rich in oleic and elaidic acid.
[d]Tall oil fatty acid containing 25-30% rosin.

TABLE III
SET TIMES OF ANIONIC SLURRIES[a]

| Emulsifier (derivatized) $C_{22}$—Tricarboxylic-Acid Anhydride/Polyamine/ Derivatizing Agent | Emulsifier Dosage (%) | Emulsion pH Value | Set Time (min.) |
|---|---|---|---|
| L-5[b]- Maleic Anhydride 2.8:1 ($I_2$)/ Amine Blend/ Acrylic Acid | 1.0 | 11.0 | ~60 |
| L-5[b]- Maleic Anhydride 2.8:0.5 ($I_2$)/ Amine Blend/ Chloroacetic Acid | 1.0 | 11.0 | ~60 |
| Oleic Acid- Maleic Anhydride 1.5:1[c]/ Amine Blend/ Acrylic Acid | 1.0 | 11.0 | ~60 |
| Oleic Acid- Maleic Anhydride 1.5:1[c]/ Amine Blend/ Chloroacetic Acid | 1.0 | 11.0 | ~60 |
| 1483[d]- Maleic Anhydride 2.8:1/ Amine Blend/ Chloroacetic Acid | 1.0 | 11.0 | ~60 |
| M28B[c]- Maleic Anhydride 2.8:1 ($I_2$)/ Amine Blend/ Acrylic Acid | 1.0 | 11.0 | 60+ |
| M28B[c]- Maleic Anhydride 2.8:1 ($I_2$)/ Amine Blend/ Chloroacetic Acid | 1.0 | 11.0 | 40 |

[a]Exxon (Humble) asphalt (penetration 50/70) and Koch AC-20 asphalt at 64% residue were used for the experiments.
[b]Tall oil fatty acid rich in linoleic and oleic acid.
[c]Excess maleic anhydride was removed by washing with water.
[d]Tall oil fatty acid rich in oleic and elaidic acid.
[e]Tall oil fatty acid containing 25-30% rosin.

While this invention has been described and illustrated herein by references to various specific materials, procedures and examples, it is understood that the invention is not restricted to the particular materials, combinations of materials, and procedures selected for that purpose. Numerous variations of such details can be employed, as will be appreciated by those skilled in the art.

What is claimed is:

1. A bituminous emulsion comprising from about 30% to about 80% by weight of bitumen, from about 0.1% to about 10% by weight of an emulsifier selected from the group consisting of reaction products of polyamines reacted with a polycarboxylic acid anhydride of the following formulae:

$$CH_3-(CH_2)_6-CH-CH=CH-(CH_2)_7COOH$$

with the ring:
$$\begin{array}{c} CH-C(=O) \\ | \quad\quad \backslash O \\ CH_2-C(=O) \end{array}$$

$$CH_3-(CH_2)_7-CH=CH-CH-(CH_2)_6COOH$$

with the ring:
$$\begin{array}{c} CH-C(=O) \\ | \quad\quad \backslash O \\ CH_2-C(=O) \end{array}$$

$$CH_3-(CH_2)_4-CH=CH-CH=CH(CH_2)_7COOH$$

with the ring:
$$\begin{array}{c} CH-C(=O) \\ | \quad\quad \backslash O \\ CH_2-C(=O) \end{array}$$

and $$CH_3-(CH_2)_5-\bigcirc-(CH_2)_7COOH$$

with the cyclohexene ring bearing the anhydride group $O=C-O-C=O$ and water to make up 100% by weight, the emulsion having a pH in the range of from 2-7.

2. The bituminous emulsion of claim 1 including up to 90% of the total emulsifier formulation of one or more auxiliary emulsifiers selected from the group consisting of fatty amines, fatty propane diamines, fatty amidoamines, fatty imidazolines, fatty monoquaternary ammonium salts, fatty diquaternary diammonium salts, and ethylene glycol polyethers of nonyl or dodecyl phenol.

3. The bituminous emulsion of claim 1 including up to 90% of the total emulsifier formulation of one or more auxiliary emulsifiers selected from the group consisting of nitrogen derivatives of resin acids and nitrogen derivatives of kraft lignin.

4. The bituminous emulsion of claim 1 wherein the emulsifier formulation is prepared by reacting a polyamine with a blend of the polycarboxylic acid anhydride of claim 1 and fatty carboxylic acids selected from the group consisting of fatty mono-, di- and tricarboxylic acids and mixtures thereof.

5. The bituminous emulsion of claim 1 wherein the emulsifier formulation is prepared by reacting a polyamine with a blend of resin acids and the polycarboxylic acid anhydride.

6. The bituminous emulsion of claim 1 wherein the emulsifier formulation is prepared by reacting a polyamine with a blend of kraft lignin and the polycarboxylic acid anhydride.

7. The bituminous emulsion of claims 1, 2, 3, 4, 5 or 6 comprising from about 60% to 70% bitumen by weight of the emulsion, from about 0.2% to 2.0% emulsifier by weight of the emulsion, and water to make up 100% by weight.

8. The bituminous emulsion of claim 1 wherein the emulsion includes from 1% to 15% by volume of a hydrocarbon oil.

9. The bituminous emulsion of claim 1 wherein a mixture of tall oil fatty acids is added to the bitumen prior to emulsification.

10. The bituminous emulsion of claim 9 wherein the tall oil fatty acids mixture is tall oil pitch.

11. A paving slurry seal mixture of an aqueous bituminous emulsion and mineral aggregate capable of being worked comprising: a densely graded mineral aggregate passing through No. 4 and at least 80% retained on 200 mesh screen; from about 8% to about 20% of an oil in water type emulsion, based on the weight of the mineral aggregate, wherein the emulsion is comprised of from about 55% to about 65% bitumen, based on the weight of the emulsion, from about 0.5% to about 2% of a cation-active emulsifier based on the weight of the emulsion, wherein the emulsifier is the reaction product of one or more polyamines reacted with a polycarboxylic acid anhydride of the following formulae:

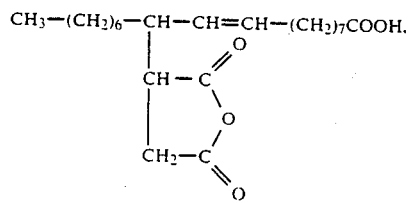

-continued

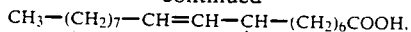

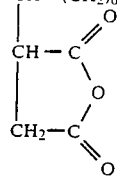

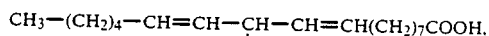

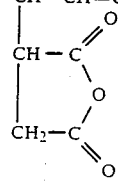

and

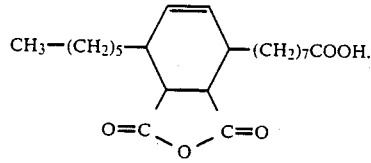

and water to make up 100% by weight of the emulsion; from about 4% to about 16% water, based on the weight of the mineral aggregate, added to form a slurry of the aggregate and the emulsion; and up to 3% of an inorganic or organic additive to reduce the setting time of the mixture.

12. The paving slurry seal mixture of claim 11 including up to 90% of the total emulsifier formulation of one or more auxiliary emulsifiers selected from the group consisting of fatty amines, fatty propane diamines, fatty amidoamines, fatty imidazolines, fatty monoquaternary ammonium salts, fatty diquaternary diammonium salts, and ethylene glycol polyethers of nonyl or dodecyl phenol.

13. The paving slurry seal mixture of claim 11 including up to 90% of the total emulsifier formulation of one or more auxiliary emulsifiers selected from the group consisting of nitrogen derivatives of resin acids and nitrogen derivatives of kraft lignin.

14. The paving slurry seal mixture of claim 11 wherein the emulsifier formulation is prepared by reacting the polyamine with a blend of the polycarboxylic acid anhydride of claim 1 and fatty carboxylic acids selected from the group consisting of fatty mono-, di- and tricarboxylic acids and mixtures thereof.

15. The paving slurry seal mixture of claim 11 wherein the emulsifier formulation is prepared by reacting the polyamines with a blend of resin acids and the polycarboxylic acid anhydride.

16. The paving slurry seal mixture of claim 11 wherein the emulsifier formulation is prepared by reacting the polyamines with a blend of kraft lignin and the polycarboxylic acid anhydride.

17. The paving slurry seal mixture of claim 11 comprising from about 55% to 65% bitumen by weight of the emulsion, from about 0.2% to 2.0% emulsifier by weight of the emulsion, and water to make up 100% by weight.

18. The paving slurry seal mixture of claim 11 wherein a mixture of tall oil fatty acids is added to the bitumen prior to emulsification.

19. The paving slurry seal mixture of claim 18 wherein the tall oil fatty acids mixture is tall oil pitch.

20. The paving slurry seal mixture of claim 11 wherein the inorganic additive is selected from the group consisting of portland cement, hydrated lime, limestone dust, fly ash, ammonium sulfate and aluminum sulfate.

* * * * *